(12) United States Patent
Lu et al.

(10) Patent No.: US 6,862,779 B1
(45) Date of Patent: Mar. 8, 2005

(54) HINGE WITH AN ANTI-BUMP FEATURE

(75) Inventors: Sheng-Nan Lu, Shulin (TW); Tien-Yueh Hsu, Shulin (TW)

(73) Assignee: Shin Zu Shing Co., Ltd., Shylin (TW)

( * ) Notice: Subject to any disclaimer, the term of this patent is extended or adjusted under 35 U.S.C. 154(b) by 0 days.

(21) Appl. No.: 10/865,755

(22) Filed: Jun. 14, 2004

(51) Int. Cl.[7] ............................................. E05C 17/64
(52) U.S. Cl. .............................. 16/340; 16/341; 16/337
(58) Field of Search ........................ 16/340, 341, 297, 16/300, 337

(56) References Cited

U.S. PATENT DOCUMENTS

| | | | | |
|---|---|---|---|---|
| 2,736,027 A | * | 2/1956 | Parmelee | 2/8 |
| 2,890,477 A | * | 6/1959 | Miller | 16/322 |
| 5,970,819 A | * | 10/1999 | Katoh | 74/531 |
| 5,996,132 A | * | 12/1999 | Sorimachi | 4/236 |
| 6,070,298 A | * | 6/2000 | Sorimachi | 16/330 |
| 6,125,507 A | * | 10/2000 | Katoh | 16/329 |
| 6,175,990 B1 | * | 1/2001 | Kato et al. | 16/334 |
| 6,665,907 B1 | * | 12/2003 | Lu | 16/340 |

* cited by examiner

Primary Examiner—Suzanne L. Barrett
Assistant Examiner—Mark Williams
(74) Attorney, Agent, or Firm—Troxell Law Office, PLLC

(57) ABSTRACT

The hinge for a piece of portable electronic equipment with a cover and a base has a keyed pivot pin, a stationary leaf, a washer, a rotating positioning element, a stationary positioning element, a biasing member, and a fastener. The washer, rotating positioning element, stationary positioning element and biasing member are sequentially mounted on the keyed pivot pin and are held in place with the fastener. The rotating positioning element has detents corresponding to and simultaneously engaging protrusions on the stationary positioning element when the hinge is closed. Because the detents and protrusions are not symmetrically oriented respectively on the rotating and stationary positioning elements, the detents will only engage the protrusions in one position, a closed position. The protrusions on the stationary positioning element press against the rotating positioning element and hold the hinge open at any desired angle.

10 Claims, 6 Drawing Sheets

HINGE WITH AN ANTI-BUMP FEATURE

BACKGROUND OF THE INVENTION

1. Field of the Invention

The present invention relates to a hinge, especially to a hinge with an anti-bump feature for a piece of portable electronic equipment with a base and a cover that will keep the cover from bumping the base when the cover is closed.

2. Description of the Prior Arts

Portable electronic equipments, for example notebook computers personal digital assistants, are being used more and more by the general public. A conventional piece of portable electronic equipment has a cover, a base and a hinge. The cover has a display mounted in the cover. The base has an input device mounted on the base. The conventional hinge is mounted between the base and the cover to attach the cover pivotally to the base. The conventional hinge has a positioning feature to hold the cover closed but also holds the cover open at 180°. The positioning feature prevents the display in the cover from hitting the base and damaging the display when the cover is closed. However, the positioning feature that holds the cover open at 180° will annoy the user. When the cover is opened to view the display, opening the cover too much will cause the hinge to go into a detent position at 180°.

To overcome the shortcomings, the present invention provides a hinge with an anti-bump feature to mitigate or obviate the aforementioned problems.

SUMMARY OF THE INVENTION

The main objective of the present invention is to provide a hinge with an anti-bump feature that will only engage when the hinge is closed and still allows the hinge to be opened to any desired angle.

The hinge for a piece of portable electronic equipment with a cover and a base comprises a keyed pivot pin, a stationary leaf, a washer, a rotating positioning element, a stationary positioning element, a biasing member, and a fastener. The washer, rotating positioning element, stationary positioning element and biasing member are sequentially mounted on the keyed pivot pin and are held in place with the fastener. The rotating positioning element has detents corresponding to and simultaneously engaging protrusions on the stationary positioning element when the hinge is closed. Because the detents and protrusions are not symmetrically oriented respectively on the rotating and stationary positioning elements, the detents will only engage the protrusions in one position, a closed position. The protrusions on the stationary positioning element press against the rotating positioning element and hold the hinge open at any desired angle.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
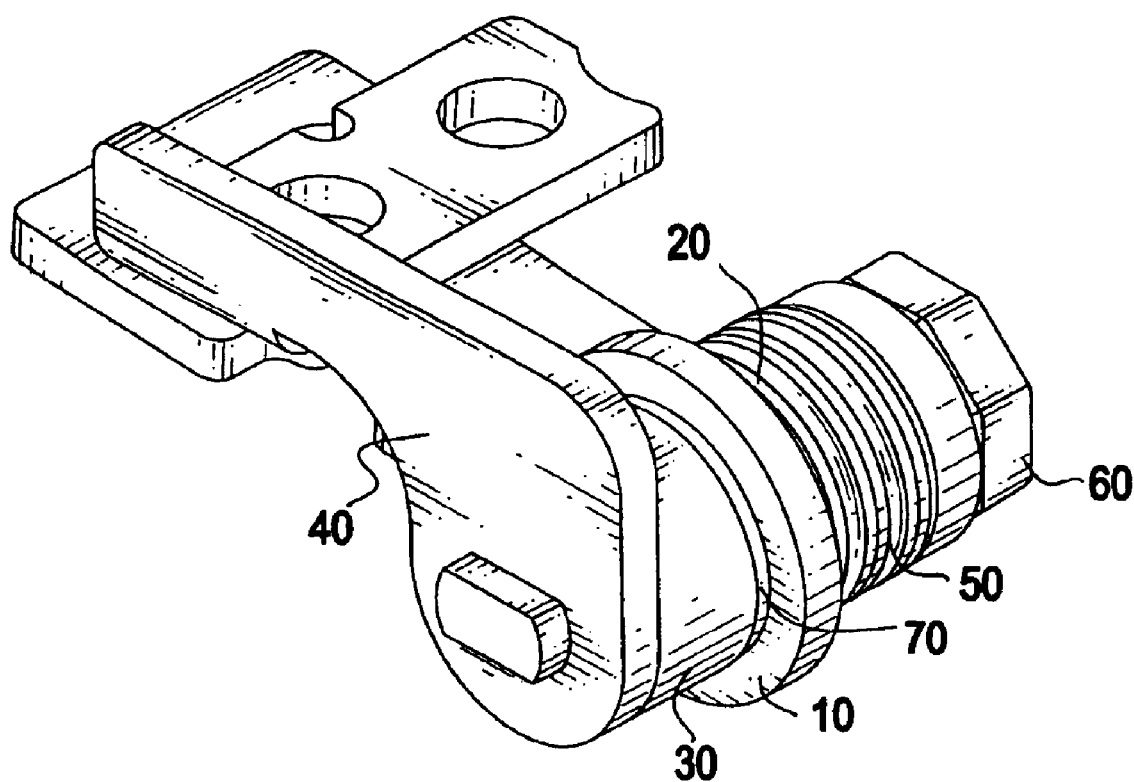
FIG. 1 is a perspective view of a hinge in accordance with the present invention.
Figure 2:
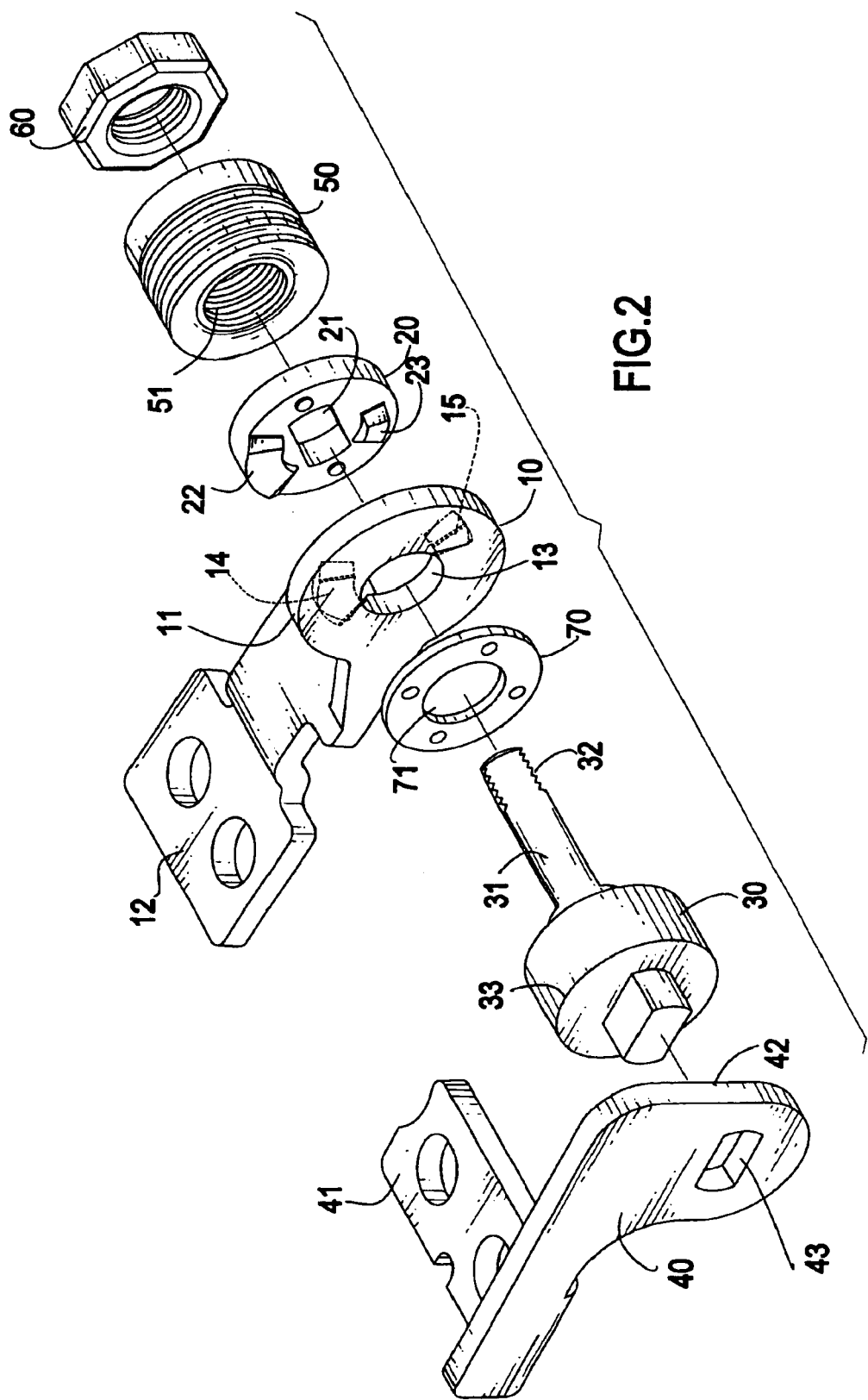
FIG. 2 is an exploded perspective view of the hinge in FIG. 1.

With the reference to FIGS. 1 and 2, a hinge in accordance with the present invention comprises a keyed pivot pin (30), a stationary leaf (40), a washer (70), a rotating positioning element (10), a stationary positioning element (20), a biasing member (50) and a fastener (60).

The keyed pivot pin (30) has a head (33) and a combination shaft (31). The head (33) has an inside end and an outside end (not numbered). The combination shaft (31) is formed on and extends coaxially from the inside end of the head (33) and has a proximal end, a distal end, and a thread (32). The thread (32) is formed on the proximal end of the combination shaft (31).

The stationary leaf (40) is securely attached to the outside end of the head (33) of the keyed pivot pin (30) and has a distal end (41), a proximal end (42), and an optional through hole (43) The through hole (43) is formed though the positioning end (42), corresponds to the outside end of the head (33) of the keyed pivot pin (30) and holds the outside end of the head (33) of the keyed pivot pin (30). The distal end (41) is attached to a base (not shown), and the proximal end (42) is attached to the outside end of the head (33).

The washer (70) has a central circular hole (71), is mounted around the combination shaft (31) and abuts the inside end of the head (33) of the keyed pivot pin (30).

The rotating positioning element (10) is mounted rotatably on the combination shaft (31) against the washer (70) and comprises a moveable leaf (12), a rotating end (11), a central circular hole (13), a first detent (14) and a second detent (15). The rotating end (11) has an inside surface and an outside surface. The central circular hole (13) is formed through the rotating end (11) and has a center.

Figure 3:
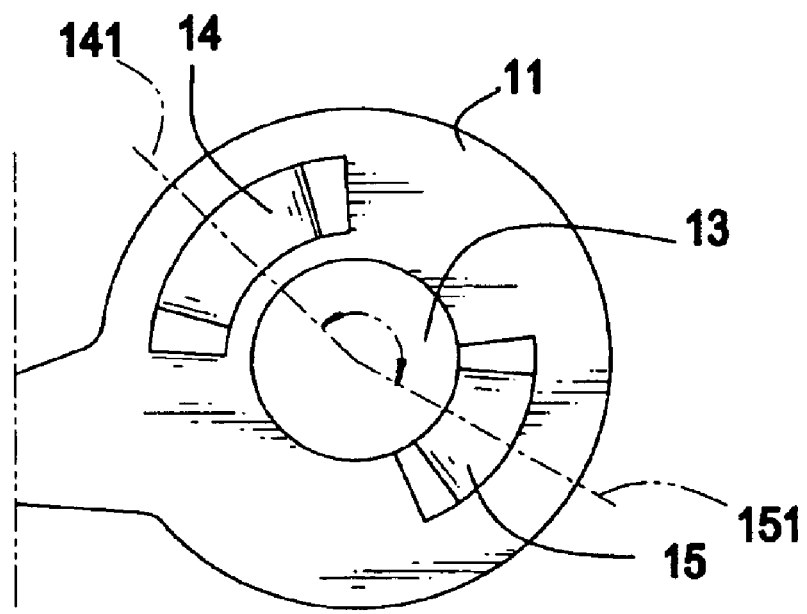
FIG. 3 is a side view of a rotating positioning element of the hinge in FIG. 1.
Figure 4:
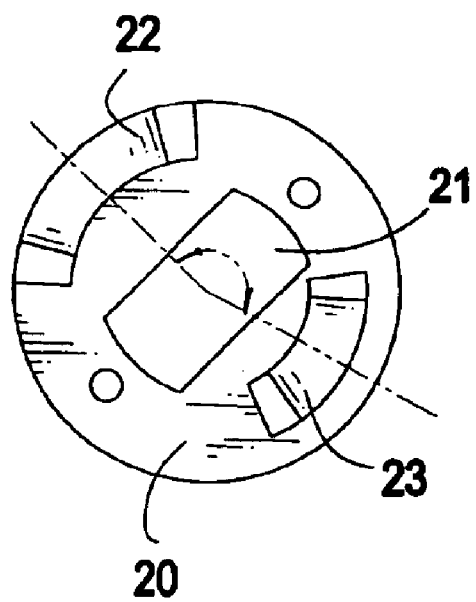
FIG. 4 is a side view of a stationary positioning element of the hinge in FIG. 1.
Figure 7:
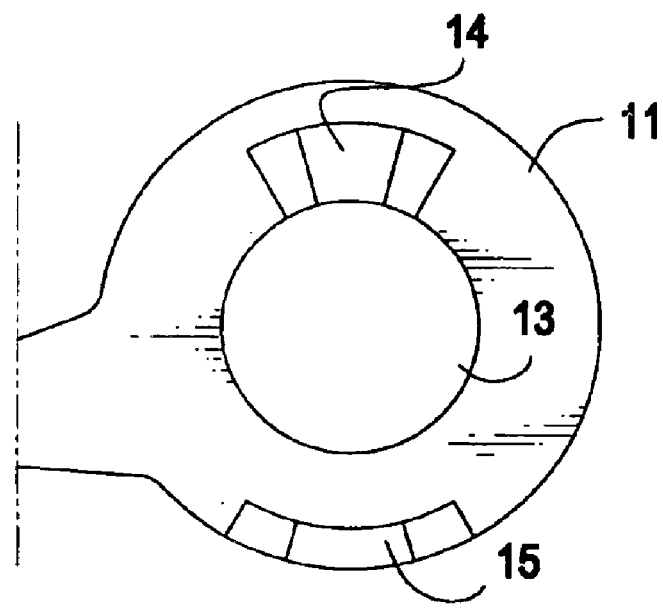
FIG. 7 is a side view of a second embodiment of a rotating positioning element for a hinge in accordance with the present invention.

With further reference to FIGS. 3 and 7, the first detent (14) and the second detent (15) are formed concentrically in the inside surface of the rotating end (11) around the central circular hole (13) and are not symmetrical with each other. The first detent (14) and second detent (15) respectively have two inclined ends. The first and second detents (14, 15) have respectively a distance from the center of the central circular hole (13) and have a centerline (141, 151), a radial thickness and an angular extension. The distance between the first detent (14) and the center of the central circular hole (13) can be different from the distance between the second detent (15) and the center of the central circular hole (13). The centerline (141) of the first detent (14) and the centerline (151) of the second detent (15) can intersect at an angle (θ) that is not equal to 180°. The radial thickness of the first detent (14) can be different from the radial thickness of the second detent (15). The angular extension of the first detent (14) can be different from the angular extension of the second detent (15).

Figure 8:
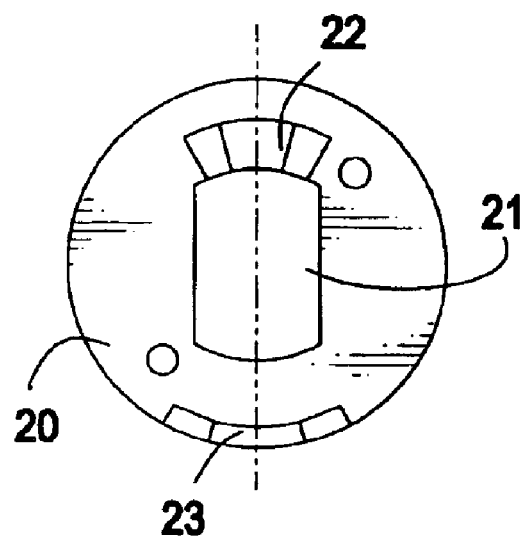
FIG. 8 is a side view of a stationary positioning element of the hinge.

With further reference to FIGS. 2 and 8, the stationary positioning element (20) is keyed on the distal end of the combination shaft (30), abuts the rotating positioning element (10) and has an inside surface, an outside surface, a central keyhole (21), a first protrusion (22) and a second protrusion (23). The central keyhole (21) is formed through the stationary positioning element (20) and keyed on the combination shaft (31) wherein the combination shaft (31) keeps the stationary positioning element (20) from rotating. The first and second protrusions (22, 23) are formed on the inside surface of the stationary positioning element (20), correspond respectively to and will simultaneously engage the first and second detents (14, 15) in the rotating positioning element (10) in one position only. The protrusions (22, 23) respectively have two inclined ends. When the hinge is closed, the first and second protrusions (22, 23) are detachably held respectively in the first and second detents (14, 15). Because the detents (14, 15) and protrusions (22, 23) are not symmetrical, the detents (14, 15) will not engage the protrusions (22, 23) when the hinge is opened.

The biasing member (50) is mounted around the distal end of the combination shaft (31) and presses the inside surface of the stationary positioning element (20) against the inside surface of the rotating positioning element (20). The biasing member (50) may be comprised of multiple biasing elements. Furthermore, the biasing member (50) can be a spring. The biasing member (50) has a central circular hole (51) formed through the biasing member (50).

The fastener (60) is attached to the distal end of the combination shaft (31) and sequentially holds the biasing member (50), the stationary positioning element (20), the rotating positioning element (10) and the washer (70) on the combination shaft (31).

The hinge as described is mounted between a cover and a base of a piece of portable electronic equipment. The moveable leaf (12) of the rotating positioning element (10) is securely attached to the cover of a piece of portable electronic equipment. The stationary end (41) of the stationary leaf (40) is attached securely to the base of the piece of portable electronic equipment.

Figure 5:
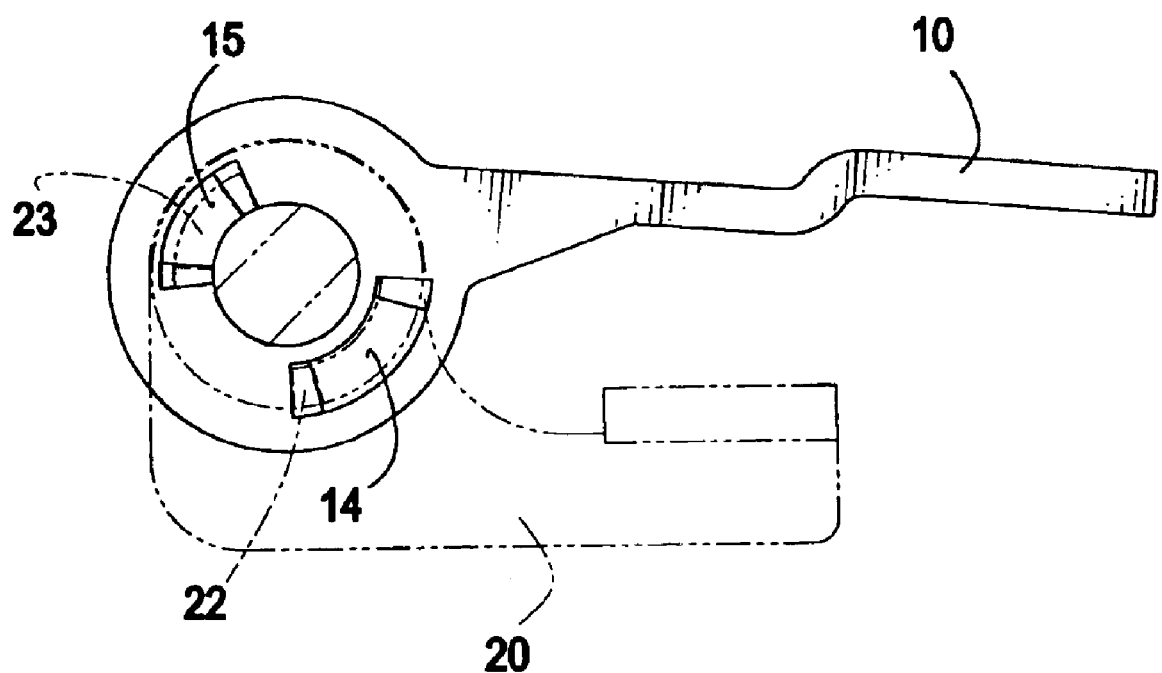
FIG. 5 is a side view of the hinge in FIG. 1 with the cover closed.

With reference to FIG. 5, the cover is closed by rotating the rotating positioning element (10). Because the central keyhole (21) in the stationary positioning element (20) is keyed on the combination shaft (31) of the keyed pivot pin (30), the keyed pivot pin (30) will keep the stationary positioning element (20) from rotating. The central circular hole (13) in the rotating positioning element (10) allows the rotating positioning element (10) to rotate on the combination shaft (31). When the hinge and the cover is closed, the first and second protrusions (22, 23) on the stationary positioning element (20) are held respectively in the first and second detents (14, 15) in the rotating positioning element (10). The engagement of the protrusions (22, 23) and the detents (14, 15) keeps the cover from hitting the base.

Figure 6:
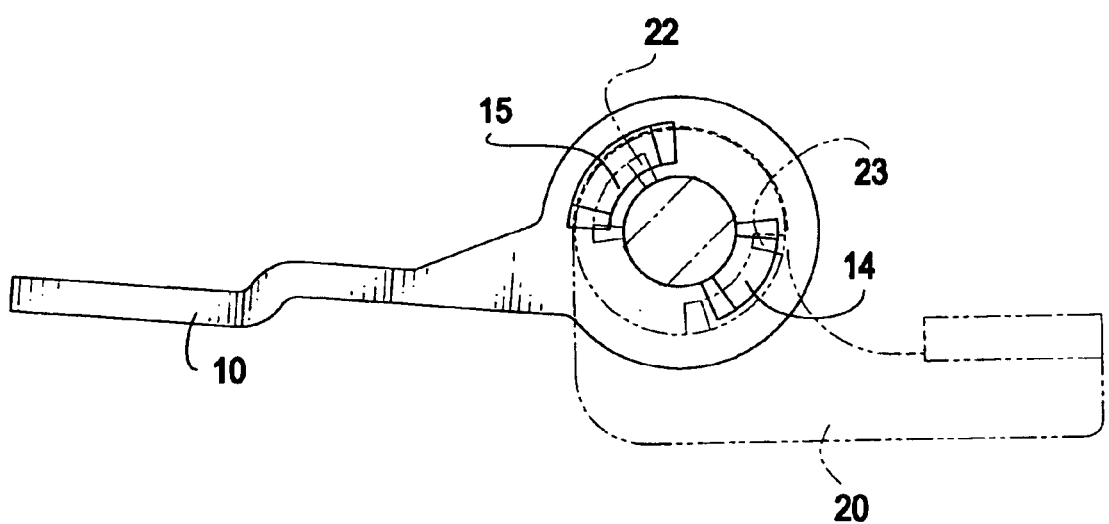
FIG. 6 is a side view of the hinge in FIG. 1 with the cover open.

With reference to FIG. 6, the cover is opened by rotating the rotating positioning element (10) and disengaging the detents (14, 15) from the protrusions (22, 23). Because the detents (14, 15) and protrusions (22, 23) are not symmetrical and the detents (14, 15) must simultaneously engage the specific corresponding protrusions (22, 23), the detents (14, 15) will not reengage the protrusions (22, 23) when the cover is open.

According to the foregoing description, the hinge in accordance with the present invention has an anti-bump feature that prevents the cover from hitting the base when the cover is closed. Therefore a display mounted on the cover will not be damaged. However, the anti-bump feature will not engage and annoy a user when the cover is opened. The cover can be opened to any visual angle.

Even though numerous characteristics and advantages of the present invention have been set forth in the foregoing description. Together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge for a piece of portable electronic equipment with a cover and a base, the hinge comprising
a keyed pivot pin having;
   a head having an inside end and an outside end;
   a combination shaft formed on and extending coaxially from the inside end of the head and having
      a proximal end;
      a distal end; and
      a thread formed on the proximal end;
a stationary leaf securely attached to the keyed pivot pin and having;
   a distal end; and
   a proximal end attached to the outside end of the head of the keyed pivot pin;
a washer mounted around the combination shaft, abutting the inside end of the head of the keyed pivot pin and having a central circular hole;
a rotating positioning element mounted rotatably on the combination shaft against the washer and having:
   a moveable leaf;
   a rotating end having an inside surface and an outside surface;
   a central circular hole formed through the rotating end and having a center;
   a first detent formed concentrically in the inside surface of the rotating end around the central circular hole at a distance from the center of the central circular hole and having two inclined ends, a centerline, a radial thickness and an angular extension; and
   a second detent formed in the inside surface of the rotating end around the central circular hole at a distance from the center of the central circular hole and having two inclined ends, a centerline, a radial thickness and an angular extension wherein the first detent and the second detent are not symmetrically arranged relative to each other about the center of the circular hole;
a stationary positioning element keyed on the distal end of the combination shaft, abutting the rotating positioning element and having;
   an inside surface;
   an outside surface;
   a central keyhole formed through the stationary positioning element keyed on the combination shaft wherein the combination shaft keeps the stationary positioning element from rotating;
   a first protrusion formed on the inside surface of the stationary positioning element, corresponding to the first detent in the rotating positioning element and detachably held in the first detent; and
   a second protrusion formed on the inside surface of the stationary positioning element and corresponding to the second detent in the rotating positioning element and detachably held in the second detent;
a biasing member mounted around the distal end of the combination shaft, pressing against the inside surface of the stationary positioning element and having a circular central hole formed through the biasing member; and a fastener attached to the distal end of the combination shaft and holding the biasing member, the stationary positioning element, the rotating positioning element and the washer on the combination shaft.

2. The hinge as claimed in claim 1, wherein the distance between the first detent and the center of the central circular hole is different from the distance between the second detent and the center of the central circular hole.

3. The hinge as claimed in claim 1, wherein the centerline of the first detent and the centerline of the second detent intersect at an angle that is not equal to 180°.

4. The hinge as claimed in claim 1, wherein the radial thickness of the first detent is different from the radial thickness of the second detent.

5. The hinge as claimed in claim 1, wherein the angular extension of the first detent is different from the angular extension of the second detent.

6. The hinge as claimed in claim 1, wherein the stationary leaf has a through hole formed though the positioning end, corresponding to the outside end of the head of the keyed pivot pin and holding the outside end of the head of the keyed pivot pin.

7. The hinge as claimed in claim 2, wherein the stationary leaf has a through hole formed though the positioning end, corresponding to the outside end of the head of the keyed pivot pin and holding the outside end of the head of the keyed pivot pin.

8. The hinge as claimed in claim 3, wherein the stationary leaf has a through hole formed though the positioning end, corresponding to the outside end of the head of the keyed pivot pin and holding the outside end of the head of the keyed pivot pin.

9. The hinge as claimed in claim 4, wherein the stationary leaf has a through hole formed though the positioning end, corresponding to the outside end of the head of the keyed pivot pin and holding the outside end of the head of the keyed pivot pin.

10. The hinge as claimed in claim 5, wherein the stationary leaf has a through hole formed though the positioning end, corresponding to the outside end of the head of the keyed pivot pin and holding the outside end of the head of the keyed pivot pin.

* * * * *